(12) United States Patent
Follen et al.

(10) Patent No.: US 10,894,482 B2
(45) Date of Patent: Jan. 19, 2021

(54) SYSTEMS AND METHODS OF BATTERY MANAGEMENT AND CONTROL FOR A VEHICLE

(71) Applicant: Cummins, Inc., Columbus, IN (US)

(72) Inventors: Kenneth M. Follen, Greenwood, IN (US); Arun Prakash Thunga Gopal, Columbus, IN (US); Vivek A. Sujan, Columbus, IN (US); Pinak Jayant Tulpule, Columbus, IN (US); Mugdha S. Sane, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 15/750,346

(22) PCT Filed: Aug. 4, 2016

(86) PCT No.: PCT/US2016/045608
§ 371 (c)(1),
(2) Date: Feb. 5, 2018

(87) PCT Pub. No.: WO2017/027332
PCT Pub. Date: Feb. 16, 2017

(65) Prior Publication Data
US 2018/0257473 A1 Sep. 13, 2018

Related U.S. Application Data

(60) Provisional application No. 62/202,264, filed on Aug. 7, 2015.

(51) Int. Cl.
*B60K 6/22* (2007.10)
*B60L 53/66* (2019.01)
(Continued)

(52) U.S. Cl.
CPC ............. *B60L 53/66* (2019.02); *B60K 6/22* (2013.01); *B60K 6/48* (2013.01); *B60L 7/10* (2013.01);
(Continued)

(58) Field of Classification Search
CPC .... B60K 6/22; B60K 6/20; B60K 6/48; B60L 53/60; B60L 53/64; B60L 53/68;
(Continued)

(56) References Cited

U.S. PATENT DOCUMENTS 7,665,559 B2   2/2010  De La Torre-Bueno
7,958,958 B2   6/2011  De La Torre Bueno
(Continued)

FOREIGN PATENT DOCUMENTS

CN    102445927      5/2012
JP    2012-085505    4/2012

OTHER PUBLICATIONS

International Search Report and Written Opinion for International Application No. PCT/US2016/045608, dated Oct. 13, 2016, 9 pages.

*Primary Examiner* — Bryan A Evans
(74) *Attorney, Agent, or Firm* — Foley & Lardner LLP

(57) ABSTRACT

Systems, apparatuses, and methods disclosed herein provide for receiving internal hybrid vehicle information, external static information, and external dynamic information; determining a propulsion power for the hybrid vehicle at a particular location at a particular time based on at least one of the internal hybrid vehicle information, the external static information, and the external dynamic information; determining a current state of charge of a battery, wherein the battery is operatively coupled to an electric motor in the hybrid vehicle; and managing a state of charge of the battery
(Continued)

at the particular location at the particular time based on the current state of charge and the determined propulsion power.

19 Claims, 3 Drawing Sheets

(51) Int. Cl.
| | | |
|---|---|---|
| B60K 6/48 | (2007.10) | |
| B60L 7/10 | (2006.01) | |
| B60L 53/64 | (2019.01) | |
| B60L 53/68 | (2019.01) | |
| B60L 58/12 | (2019.01) | |
| B60W 20/12 | (2016.01) | |
| B60W 10/06 | (2006.01) | |
| B60W 50/00 | (2006.01) | |
| B60W 10/08 | (2006.01) | |
| B60L 53/62 | (2019.01) | |

(52) U.S. Cl.
CPC .............. *B60L 53/62* (2019.02); *B60L 53/64* (2019.02); *B60L 53/68* (2019.02); *B60L 58/12* (2019.02); *B60W 10/06* (2013.01); *B60W 10/08* (2013.01); *B60W 20/12* (2016.01); *B60W 50/0097* (2013.01); B60K 2006/4825 (2013.01); B60L 2240/70 (2013.01); B60L 2260/54 (2013.01); B60W 2050/0078 (2013.01); B60W 2552/20 (2020.02); B60W 2556/45 (2020.02); B60W 2710/244 (2013.01); Y02T 10/70 (2013.01); Y02T 10/7072 (2013.01); Y02T 10/72 (2013.01); Y02T 90/12 (2013.01); Y02T 90/14 (2013.01); Y02T 90/16 (2013.01); Y02T 90/167 (2013.01); Y04S 30/12 (2013.01); Y04S 30/14 (2013.01)

(58) Field of Classification Search
CPC .. B60L 58/12; B60L 58/13; B60L 7/10; B60L 2240/70; B60L 2260/54; B60W 2550/40
See application file for complete search history.

(56) References Cited

U.S. PATENT DOCUMENTS

| | | |
|---|---|---|
| 8,036,785 B2 | 10/2011 | Maguire et al. |
| 8,204,640 B2 | 6/2012 | Tani et al. |
| 8,217,620 B2 * | 7/2012 | Hanssen ................ B60K 6/48 320/104 |
| 8,340,849 B2 | 12/2012 | Amano et al. |
| 8,370,012 B2 | 2/2013 | Yamada et al. |
| 8,374,740 B2 | 2/2013 | Druenert et al. |
| 8,401,733 B2 | 3/2013 | Weslati et al. |
| 8,515,607 B2 | 8/2013 | Amano et al. |
| 8,560,155 B2 | 10/2013 | Kedar-Dongarkar et al. |
| 8,612,082 B2 | 12/2013 | Hashimoto et al. |
| 8,613,333 B2 | 12/2013 | Janczak et al. |
| 8,688,302 B2 | 4/2014 | Sujan et al. |
| 8,751,083 B2 | 6/2014 | Huntzicker |
| 8,751,087 B1 | 6/2014 | Dufford |
| 8,761,981 B2 | 6/2014 | Hussain et al. |
| 8,839,890 B2 | 9/2014 | Caruso et al. |
| 8,903,578 B2 * | 12/2014 | Yamazaki ............ B60W 20/00 701/22 |
| 8,973,690 B2 | 3/2015 | Yates et al. |
| 9,043,106 B2 | 5/2015 | Ingram et al. |
| 9,058,038 B2 | 6/2015 | Zhang et al. |
| 9,096,207 B2 * | 8/2015 | Madurai Kumar ...... B60K 6/48 |
| 2011/0246010 A1 | 10/2011 | De La Torre Bueno |
| 2012/0010767 A1 | 1/2012 | Phillips et al. |
| 2012/0310471 A1 | 12/2012 | Sengoku et al. |
| 2013/0131892 A1 | 5/2013 | Hashimoto et al. |
| 2013/0151044 A1 | 6/2013 | Lee |
| 2013/0197730 A1 * | 8/2013 | Huntzicker ............ B60L 11/16 701/22 |
| 2013/0274952 A1 | 10/2013 | Weslati et al. |
| 2014/0017530 A1 * | 1/2014 | Youngs .................... B60K 6/28 429/62 |
| 2014/0139354 A1 | 5/2014 | Miyazaki |
| 2014/0207321 A1 * | 7/2014 | King .................... B60W 40/02 701/22 |
| 2014/0232356 A1 | 8/2014 | Kyoung |
| 2015/0027837 A1 | 1/2015 | Lamba |
| 2015/0032310 A1 | 1/2015 | Zettel et al. |
| 2015/0057906 A1 * | 2/2015 | Nefedov ................ G05D 13/02 701/93 |
| 2015/0066837 A1 | 3/2015 | Twarog et al. |
| 2015/0073639 A1 | 3/2015 | Minarcin et al. |
| 2015/0151736 A1 | 6/2015 | Kim |
| 2015/0165916 A1 | 6/2015 | Kim et al. |
| 2015/0175020 A1 | 6/2015 | Kim et al. |
| 2015/0275787 A1 | 10/2015 | Dufford et al. |
| 2015/0275788 A1 | 10/2015 | Dufford et al. |
| 2015/0336458 A1 | 11/2015 | Lee et al. |
| 2016/0031339 A1 | 2/2016 | Geo |
| 2016/0046278 A1 | 2/2016 | Matsuzaki et al. |
| 2016/0052420 A1 | 2/2016 | Kim |
| 2016/0107634 A1 | 4/2016 | Kim et al. |
| 2016/0114787 A1 | 4/2016 | Yang et al. |
| 2016/0129918 A1 | 5/2016 | Skaff et al. |

* cited by examiner

SYSTEMS AND METHODS OF BATTERY MANAGEMENT AND CONTROL FOR A VEHICLE

CROSS-REFERENCE TO RELATED APPLICATIONS

This application claims the benefit of U.S. Provisional Patent Application No. 62/202,264, filed Aug. 7, 2015, entitled "SYSTEMS AND METHODS OF BATTERY MANAGEMENT AND CONTROL FOR A VEHICLE," which is incorporated herein by reference in its entirety.

TECHNICAL FIELD

The present disclosure relates to control strategies of powertrain systems for a vehicle. More particularly, the present disclosure relates to control strategies of electrified powertrain systems for vehicles.

BACKGROUND

In a vehicle, the powertrain or powertrain system refers to the components that provide the power to propel the vehicle. These components include the engine, transmission, drive/propeller shaft, differentials, and final drive. In operation and for an internal combustion engine, the engine combusts a fuel to generate mechanical power in the form of a rotating a crankshaft. The transmission receives the rotating crankshaft and manipulates the engine speed (i.e., the rotation of the crankshaft) to control a rotation speed of the drive/propeller shaft, which is also coupled to the transmission. The rotating drive shaft is received by a differential, which transmits the rotational power to a final drive (e.g., wheels) to effect a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel).

In regard to a hybrid vehicle, conventional hybrid engine systems generally include both an electric motor and an internal combustion engine that are capable of powering the drivetrain in order to propel the car. A hybrid vehicle can have various configurations. For example, in a parallel configuration both the electric motor and the internal combustion engine are operably connected to the drivetrain/transmission to propel the vehicle. In a series configuration, the electric motor is operably connected to the drivetrain/transmission and the internal combustion engine indirectly powers the drivetrain/transmission by powering the electric motor.

In typical operation of the hybrid vehicle, the electric motor is discharged on demand or according to one more predefined control strategies. For example, some hybrid vehicles may turn off the internal combustion engine at prolonged stops and solely use the electric motor to provide the initial acceleration when an acceleration demand is commanded. While effective, these conventional hybrid vehicles use static control methodologies that leave more robust energy management and control strategies to be desired.

SUMMARY

One embodiment relates to an apparatus. The apparatus includes an internal information module structured to receive internal information regarding operation of a hybrid vehicle. The apparatus also includes an external static information module structured to obtain external static information for a route of the vehicle, wherein the external static information is based on a position of the hybrid vehicle on the route. The apparatus further includes an external dynamic information module structured to receive external dynamic information for the route of the hybrid vehicle, wherein the external dynamic information is based on the position and a time of travel of the hybrid vehicle at the position. The apparatus yet further includes a battery management module communicably coupled to each of the internal information module, the external static information module, and the external dynamic information module. According to one embodiment, the battery management module includes: a propulsion power module structured to determine a potential propulsion power for the hybrid vehicle at a particular location for a particular time on the route based on at least one of the internal information, the external static information, and the external dynamic information; and a battery state of charge module structured to manage a state of charge of a battery of the hybrid vehicle at the particular location at the particular time based on the determined potential propulsion power.

Another embodiment relates to an apparatus. The apparatus includes a battery management module of a hybrid vehicle, wherein the battery management module is communicably coupled to at least one of an internal information module, an external static information module, and an external dynamic information module. According to one embodiment, the battery management module includes: a propulsion power module structured to determine a potential propulsion power for the hybrid vehicle at a particular location on the route based on at least one of internal information from the internal information module, external static information from the external static information module, and external dynamic information from the external dynamic information module; and a battery state of charge module structured to manage a state of charge of a battery of the hybrid vehicle at the particular location based on the determined potential propulsion power.

Yet another embodiment relates to an apparatus. The apparatus includes a battery management module for a hybrid vehicle. According to one embodiment, the battery management module includes: a propulsion power module structured to determine a potential propulsion power for the hybrid vehicle at a particular location of a route of the hybrid vehicle at a particular time based on at least one of internal information regarding the hybrid vehicle, external static information regarding the route of the hybrid vehicle, and external dynamic information regarding one or more upcoming potential conditions along the route of the hybrid vehicle; and a battery state of charge module structured to manage a state of charge of a battery of the hybrid vehicle at the particular location at the particular time based on the determined potential propulsion power.

Still another embodiment relates to a method. The method includes receiving, by a controller of a hybrid vehicle, internal hybrid vehicle information, external static information, and external dynamic information; determining, by the controller of the hybrid vehicle, a propulsion power for the hybrid vehicle at a particular location at a particular time based on at least one of the internal hybrid vehicle information, the external static information, and the external dynamic information; determining, by the controller, a current state of charge of a battery, wherein the battery is operatively coupled to an electric motor in the hybrid vehicle; and managing, by the controller, the state of charge of the battery at the particular location at the particular time based on the current state of charge and the determined propulsion power.

Still another embodiment relates to a method. The method includes receiving, by a controller of a hybrid vehicle, external dynamic information for a vehicle indicative of at least one of a market characteristic and a market regulation; managing, by the controller, a state of charge of a battery of the hybrid vehicle based on at least one of the market characteristic and market regulation; and selectively adjusting, by the controller, a state of charge reference point of the battery based on an instruction received from a remote device. Advantageously, the method may provide and facilitate optimized management of the state of charge of the battery over a trip or route of the hybrid vehicle.

Yet another embodiment relates to a method. The method includes receiving, by a controller of a hybrid vehicle, at least one of internal information, external static information, and external dynamic information; managing, by the controller, a state of charge of a battery of the hybrid vehicle based on at least one of the internal information, external static information, and external dynamic information; and selectively adjusting, by the controller, a state of charge of the battery based on an instruction received from a remote device. According to one embodiment, the external dynamic information includes a calibration set point for the controller, wherein the calibration set point is determined by a remote controller using at least one of the external dynamic information, external static information, and internal information.

Another embodiment relates to a system. The system includes a battery for use in a vehicle; and a controller communicably and operatively coupled to the battery. According to one embodiment, the controller is structured to: receive at least one of the internal vehicle information, external static information, and external dynamic information; determine a propulsion power for the vehicle at a particular location at a particular time based on at least one of the internal vehicle information, the external static information, and the external dynamic information; determine a current state of charge of a battery; and manage a state of charge of the battery at the particular location at the particular time based on the current state of charge and the determined propulsion power.

These and other features, together with the organization and manner of operation thereof, will become apparent from the following detailed description when taken in conjunction with the accompanying drawings.

DETAILED DESCRIPTION OF VARIOUS EMBODIMENTS

Figure 1:
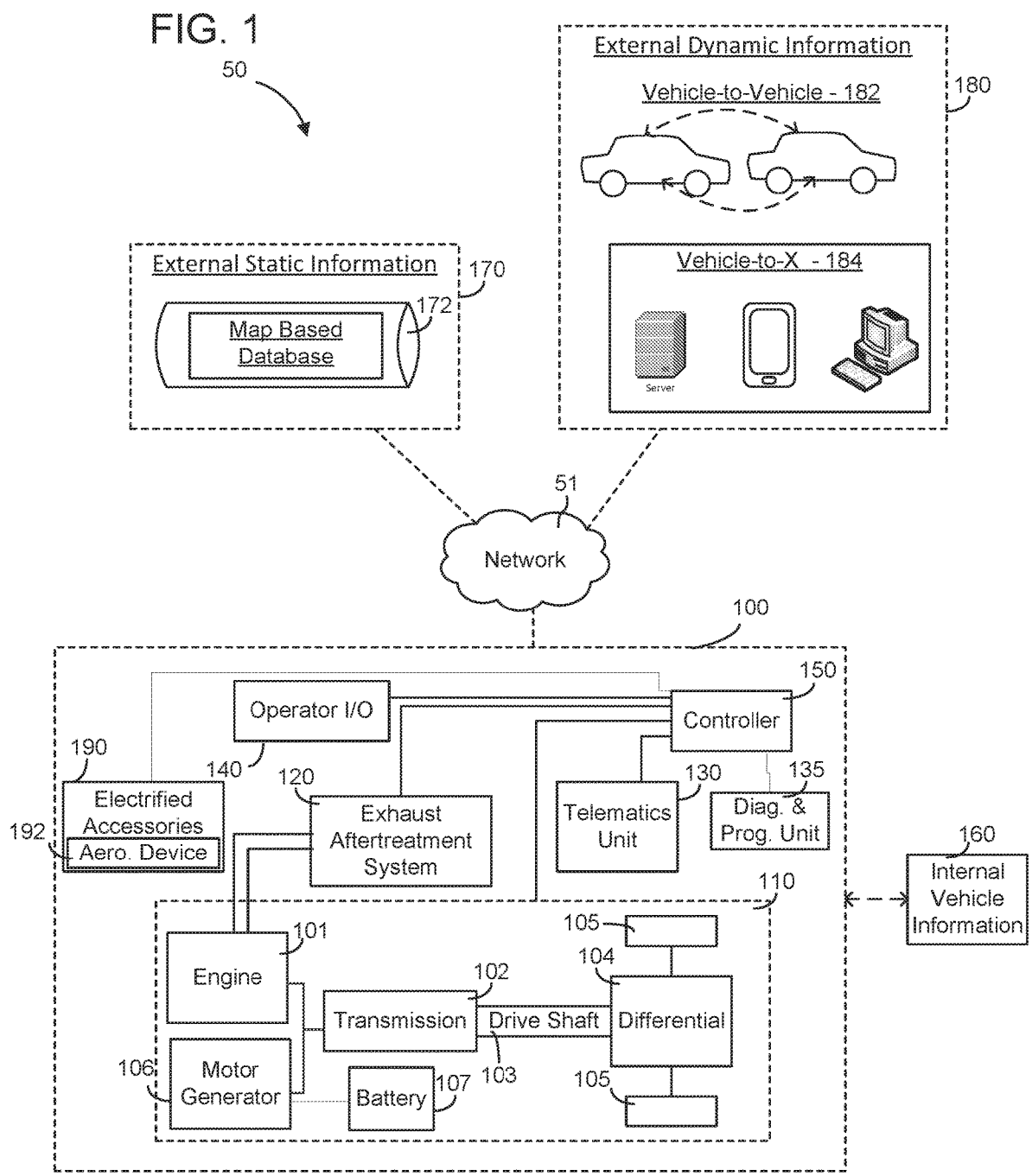
FIG. 1 is a schematic diagram of an intelligent transportation system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods of managing and controlling a battery state of charge to meet a determined and/or predicted power output based on internal vehicle information, static external vehicle information (e.g., information that may change with distance but not with time), and dynamic external vehicle information (e.g., information that may change with time) for at least a partial hybrid vehicle (e.g., a vehicle that has an electrified powertrain). According to the present disclosure, a controller may be communicably coupled to one or more external data providing sources (e.g., a telematics system provider, another vehicle via a Vehicle-to-Vehicle network, a Vehicle-to-X network, etc.), such that the controller may receive data and have a knowledge of one or more upcoming conditions for the vehicle. Based on these conditions, the controller may determine a power output required or that may be required to traverse these conditions. In response, the controller may adjust, manage, or otherwise control a battery state of charge for managing the power output from the electric motor in connection with the engine to efficiently or optimally operate the vehicle according to one or more desired operating conditions (e.g., an emissions condition, a fuel economy condition, an energy capture condition, etc.). For example, the controller may receive data indicative of at least one of a change in road grade and a speed limit at a particular location at a particular time and in response, determine a propulsion power to traverse the particular location at the particular time based on the data and a power change relative to the current propulsion power. Based on these determinations, the controller may manage the battery state of charge in advance of the vehicle traversing this particular location at the particular time to optimally operate vehicle. As mentioned above, this may be based on one or more predefined operating parameters for the vehicle. For example, the controller may discharge the battery in advance of a downhill grade in order to capture a maximum or a substantially maximum amount of energy from vehicle braking (e.g., a regenerative braking system) during traversal of the downhill grade. Advantageously, the discharging of the battery may occur in a location where the discharge may otherwise have not occurred during conventional operation, which may reduce fuel consumption and improve emissions of the vehicle. These and other features of the present disclosure are described more fully herein below.

As used herein, the phrase "state of charge" (SOC) refers to the charge level of the battery (i.e., a current battery capacity versus the maximum battery capacity, usually expressed as a percentage). As also used herein, "battery capacity" refers to the amount of charge a battery can deliver for a specific amount of time (expressed in ampere-hours). For example, a 100 ampere-hours capacity refers to a battery that can deliver 5 amperes for 20 hours (5 amperes*20 hours=100 ampere-hours). As also used herein, the phrase "battery life" refers to at least one of a shelf life of a battery (i.e., how long a battery can remain operational before not satisfying specific performance criteria) and a cycle life of a battery (i.e., how many charge-discharge cycles a battery can endure before not satisfying specific performance criteria). Specific performance criteria may include any predefined acceptable operating range for the battery. For example, a battery that is only capable of 75 ampere-hours from its original 100 ampere-hours may be deemed to not meet the minimum performance criteria of 80 ampere-hours. The acceptable performance criteria may be defined in regard to other variables and/or characteristics of the battery as well. Also, as used herein, the phrase "state of health" (SOH) refers to the current state of battery life. Whereas SOC refers to the current level of charge in the battery, the SOH refers to the amount of charge a battery can hold (typically, expressed as a percentage in relation to an original amount of charge capacity of the battery).

Referring now generally to FIG. 1, a schematic diagram of an intelligent transportation system is shown according to one embodiment. The intelligent transportation system (ITS) 50 is structured to provide an environment that facilitates and allows the exchange of information or data (e.g., communications) between a vehicle, such as vehicle 100, and one or more other components or sources. In this regard and for example, the ITS 50 may include telematics systems that facilitate the acquisition and transmission of data acquired regarding the operation of the vehicle 100. As shown and generally speaking, the ITS 50 includes a vehicle 100 communicably coupled via a network 51 to each of an external static information source 170 and an external dynamic information source 180, where the term "external" refers to a component or system outside of the vehicle 100. The information/data may be stored inside or outside of the vehicle 100.

The network 51 may be any type of communication protocol that facilitates the exchange of information between and among the vehicle 100 and the external static and dynamic information sources 170 and 180. In this regard, the network 51 may communicably couple the vehicle 100 with each of the external static and dynamic information sources 170 and 180. In one embodiment, the network 51 may be configured as a wireless network. In this regard, the vehicle 100 may wirelessly transmit and receive data from at least one of the external static and dynamic information sources 170 and 180. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 150 and/or telematics unit 130 of the vehicle 100 may electrically, communicably, and/or operatively couple via a fiber optic cable to the network 51 to selectively transmit and receive data wirelessly to and from at least one of the external static and dynamic information sources 170 and 180.

The external static information source 170 may be any information (e.g., data, value, etc.) provider capable of providing external static information, where external static information refers to information or data that may vary as a function of position (e.g., the curvature or grade of the road may vary along a route) but is substantially unchanging with respect to time. In this regard, the external static information source 170 may include one or more map based databases 172, where the map based database 172 includes static information including, but not limited to, road grade data (e.g., the road grade at various spots along various routes), speed limit data (e.g., posted speed limits in various road locations), elevation or altitude data at various points along a route, curvature data at various points along a route, location of intersections along a route, etc. It should be understood that the present disclosure contemplates other sources of external static information (e.g., a global positioning system satellite that provides latitude, longitude, and/or elevation data), such that the database configuration is not meant to be limiting or intended to be the only type of static information source contemplated.

The external dynamic information source 180 may be any external dynamic information (e.g., data, value, etc.) provider, where external dynamic information refers to information or data that may vary as a function of both time and location (e.g., weather conditions). In this regard, the external dynamic information source 180 may include any source capable of providing the external dynamic information. Accordingly, the external dynamic information source 180 may include vehicle-to-vehicle 182 communications. In this regard, the vehicle 100 may communicate with one or more other vehicles directly (e.g., via NFC, etc.) to obtain data regarding one or more upcoming conditions for the vehicle 100. In another embodiment, the external dynamic information source 182 may include a vehicle-to-X 184 configuration, where the "X" refers to any remote information providing source. For example and as shown in FIG. 1, the remote information providing source may include one or more servers, computers, mobile devices, etc. Accordingly, the external dynamic information may include, but is not limited to, a traffic density at a particular location at a particular time, a weather condition at a particular location at a particular time, a fuel price at a particular location at a particular time, an electricity cost at a particular location at a particular time, etc. In this regard, the external dynamic information may provide an indication of at least one of a market characteristic and regulation at a particular location at a particular time. The market characteristic may include, but is not limited to, a fuel price, an electricity cost, electrical charging locations, and so. The market regulation may include, but is not limited to, an emission regulation (e.g., a permissible NOx and CO amount, etc.), a braking regulation (e.g., no engine braking, etc.), a noise regulation, and so on. The market characteristics and regulations may be classified under external dynamic information due to the potentiality of change over time. However, in other embodiments, the market characteristics and regulations may alternatively be classified under external static information for the nature of these data points may be substantially non-changing with respect to extended periods of time. Like the external static information sources 170, it should be understood that the present disclosure contemplates other sources of external dynamic information sources, such that the depicted examples are not meant to be limiting or intended to be the only type of dynamic information source contemplated.

Referring now to the vehicle 100 of FIG. 1, the vehicle 100 is communicably coupled with each of the external static and dynamic sources 170, 180 via the network 51. In the embodiment depicted, the vehicle 100 is structured as a hybrid vehicle having an internal combustion engine 101 power source and a motor/generator 106 power source. The vehicle 100 may be configured as any type of hybrid-powered vehicle (e.g., a full electric vehicle, a plug-in hybrid vehicle, etc.). As such, the vehicle 100 may be configured as an on-road or an off-road vehicle including, but not limited to, line-haul trucks, mid-range trucks (e.g., pick-up truck), tanks, airplanes, and any other type of vehicle that utilizes a transmission. Before delving into the particulars of the ITS 50 in regard to the vehicle 100, the various components of the vehicle 100 may be described as follows. The vehicle 100 is shown to generally include a powertrain system 110, an exhaust aftertreatment system 120, a telematics unit 130, a diagnostic and prognostic system 135, an operator input/output (I/O) device 140, one or more electrified accessories 190, and a controller 150, where the controller 150 is communicably coupled to each of the aforementioned components.

The powertrain system 110 facilitates power transfer from the engine 101 and/or motor generator 106 to power and/or propel the vehicle 100. The powertrain system 110 includes an engine 101 and a motor generator 106 operably coupled to a transmission 102 that is operatively coupled to a drive shaft 103, which is operatively coupled to a differential 104, where the differential 104 transfers power output from the engine 101 and/or motor generator 106 to the final drive (shown as wheels 105) to propel the vehicle 100. In this regard, the powertrain system 110 is structured as an electrified powertrain. The electrified powertrain includes the motor generator 106, where the motor generator 106 may include a torque assist feature, a regenerative braking energy capture ability, a power generation ability, and any other feature of motor generators used in hybrid vehicles. In this regard, the motor generator 106 may be any conventional motor generator that is capable of generating electricity and produce a power output to drive the transmission 102. The motor generator 106 may also include a power conditioning device such as an inverter and a motor controller.

The electrified powertrain may also include any one or more of several electrified accessories 190 including, but not limited to, an electrically driven/controlled air compressor, an electrically driven/controlled engine cooling fan, an electrically driven/controlled heating venting and air conditioning system, an alternator, etc., where the controllability may stem from the controller 150. As shown, the electrified accessories 190 may also include one or more controllable aerodynamic devices 192. The one or more aerodynamic devices 192 may include, but are not limited to, an active spoiler (as opposed to a passive spoiler that is fixedly attached to the vehicle), active trailer fairings for a semi-tractor trailer, an active cabin roof fairing, and so on. In one embodiment, the one or more aerodynamic devices 192 are electrically coupled to the battery 107, such that the one or more aerodynamic devices 192 (and accessories 190 in general) may be at least partially powered by the battery 107. It should be understood that the present disclosure contemplates any and all other types of electrically-powered accessories 190 and aerodynamic devices 192 that may be a part of the powertrain system 110 and/or separate from the powertrain system 110 but included in the vehicle 100.

As a brief overview, the engine 101 receives a chemical energy input (e.g., a fuel such as gasoline or diesel) and combusts the fuel to generate mechanical energy, in the form of a rotating crankshaft. In comparison, the motor generator 106 may be in a power receiving relationship with an energy source, such as battery 107 that provides an input energy (and stores generated electrical energy) to the motor generator 106 for the motor generator 106 to output in the form of useable work or energy to in some instances propel the vehicle 100 alone or in combination with the engine 101. In this configuration, the hybrid vehicle 100 has a parallel drive configuration. However, it should be understood, that other configurations of the vehicle 100 are intended to fall within the spirit and scope of the present disclosure (e.g., a series configuration and non-hybrid applications, such as a full electric vehicle, etc.). As a result of the power output from at least one of the engine 101 and the motor generator 106, the transmission 102 may manipulate the speed of the rotating input shaft (e.g., the crankshaft) to achieve a desired drive shaft 103 speed. The rotating drive shaft 103 is received by a differential 104, which provides the rotation energy of the drive shaft 103 to the final drive 105. The final drive 105 then propels or moves the vehicle 100.

The engine 101 may be structured as any internal combustion engine (e.g., compression-ignition or spark-ignition), such that it can be powered by any fuel type (e.g., diesel, ethanol, gasoline, etc.). Similarly, although termed a 'motor generator' 106 throughout the pages of the disclosure, thus implying its ability to operate as both a motor and a generator, it is contemplated that the motor generator component, in some embodiments, may be an electric generator separate from the electric motor of the hybrid vehicle 100. Furthermore, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

Moreover, the battery 107 may be configured as any type of rechargeable (i.e., primary) battery and of any size. That is to say, the battery 107 may be structured as any type of electrical energy storing and providing device, such as one or more capacitors (e.g., ultra-capacitors, etc.) and/or one or more batteries typically used or that may be used in hybrid vehicles (e.g., Lithium-ion batteries, Nickel-Metal Hydride batteries, Lead-acid batteries, etc.). The battery 107 may be operatively and communicably coupled to the controller 150 to provide data indicative of one or more operating conditions or traits of the battery 107. The data may include a temperature of the battery, a current into or out of the battery, a number of charge-discharge cycles, a battery voltage, etc. As such, the battery 107 may include one or more sensors coupled to the battery 107 that acquire such data. In this regard, the sensors may include, but are not limited to, voltage sensors, current sensors, temperature sensors, etc.

As also shown, the vehicle 100 includes an exhaust aftertreatment system 120 in fluid communication with the engine 101. The exhaust aftertreatment system 120 receives the exhaust from the combustion process in the engine 101 and reduces the emissions from the engine 101 to less environmentally harmful emissions (e.g., reduce the NOx amount, reduce the emitted particulate matter amount, etc.). The exhaust aftertreatment system 120 may include any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor). It should be understood that other embodiments may exclude an exhaust aftertreatment system and/or include different, less than, and/or additional components than that listed above. All such variations are intended to fall within the spirit and scope of the present disclosure.

The vehicle 100 is also shown to include a telematics unit 130. The telematics unit 130 may be structured as any type of telematics control unit. Accordingly, the telematics unit 130 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 130 and one or more remote devices (e.g., a provider/manufacturer of the telematics device, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 130 may also include a communications interface for communicating with the controller 150 of the vehicle 100. The communication interface for communicating with the controller 150 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 150 and the telematics unit 130. In other embodiments, a local area network (LAN), a wide area network (WAN), or an external computer (for example, through the Internet using an Internet Service Provider) may provide, facilitate, and support communication between the telematics unit 130 and the controller 150. In still another embodiment, the communication between the telematics unit 130 and the controller 150 is via the unified diagnostic services (UDS) protocol. All such variations are intended to fall within the spirit and scope of the present disclosure.

The vehicle 100 is also shown to include a diagnostic and prognostic unit 135. In one embodiment, the diagnostic and prognostic unit 135 may be configured as any type of on-board detection system (e.g., OBD II, OBD I, EOBD, JOBD, etc.). In another embodiment, the diagnostic and prognostic unit 135 may be structured as any type diagnostic and prognostic unit included with a vehicle. Accordingly, the diagnostic and prognostic unit 135 may be communicably coupled to one or more sensors, physical or virtual, positioned throughout the vehicle 100 such that the diagnostic and prognostic unit 135 may receive date indicative of one or more fault conditions, potential symptoms, and/or operating conditions to determine a status of a component (e.g., healthy, problematic, malfunctioning, etc.). If the diagnostic and prognostic unit 135 detects a fault, the diagnostic and prognostic unit 135 may trigger a fault code and provide an indication to the operator input/output device 140 of the vehicle (e.g., a check engine light, etc.).

The operator input/output device 140 enables an operator of the vehicle to communicate with the vehicle 100 and the controller 150. For example, the operator input/output device 140 may include, but is not limited, an interactive display (e.g., a touchscreen, etc.), an accelerator pedal, a clutch pedal, a shifter for the transmission, a cruise control input setting, etc.

Via the input/output device 140, the operator can designate preferred characteristics of one or more vehicle parameters. In this regard, the operator may define or directly affect one or more power split characteristics for the engine 101 and motor generator 106 of the hybrid vehicle. For example, the operator may desire to minimize fuel consumption of the engine 101. In another example, the operator may desire to minimize an emissions amount from the engine 101. In still another example, the operator may desire to maintain or substantially maintain a noise output from the vehicle below a threshold or within a range. In yet another example, the operator may desire to minimize a total cost of ownership of the vehicle (e.g., minimize an electrical energy and fuel consumption cost to reduce the cost-to-own of the vehicle). As mentioned above, these predefined desires may impact the power split characteristic. For example, to minimize fuel consumption, the controller 150 may actively manage the battery SOC to facilitate a relatively more active and higher power output from the motor generator 106 to reduce the reliance on the engine 101. In a similar example, to minimize an emissions amount, the controller 150 may also manage the battery SOC to facilitate a relatively more active and higher power output from the motor generator 106 to reduce the emissions from the engine 101. In turn, the power split between the motor generator 106 and the engine 101 may be adjusted to meet or substantially meet on or more predefined operating parameters for the vehicle. It should be understood that the aforementioned list is not meant to be limiting as the present disclosure contemplates various other types of desired operating parameters and subsequently power splits are intended to fall within the spirit and scope of the present disclosure.

As shown, the controller 150 is communicably coupled to the powertrain system 110, the exhaust aftertreatment system 120, the telematics unit 130, the diagnostic and prognostic unit 135, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data (e.g., instructions, commands, signals, values, etc.) from one or more of the components shown in FIG. 1. This may generally be referred to as internal vehicle information 160 (e.g., data, values, etc.). The internal vehicle 160 information represents determined, acquired, predicted, estimated, and/or gathered data regarding one or more components in vehicle 100.

Accordingly, the internal vehicle information 160 may include data regarding the battery 107. As mentioned above, the data regarding the battery 107 may include, but is not limited to, a temperature of the battery, a current into or out of the battery, a number of charge-discharge cycles, a battery state of charge, a battery voltage, etc. The internal vehicle information 160 may also include information from the diagnostic and prognostic unit 135, which may include, but is not limited to, one or more fault codes, data identifiers, diagnostic trouble codes, and so on. The internal vehicle information 160 may also include data regarding the motor generator 106. Data regarding the motor generator 106 may include, but is not limited to, a power consumption rate, a power output rate, an hours of operation amount, a temperature, etc. The internal vehicle information 160 may further include data regarding the one or more electrified accessories 190 and aerodynamic devices 192, such as a power consumption rate, a current operation status (e.g., active or inactive, operational or symptomatic, etc.), and so on. The internal vehicle information 160 may also include other data regarding the powertrain system 110 (and other components in the vehicle 100). For example, the data regarding the powertrain system 110 may include, but is not limited to, the vehicle speed, the current transmission gear/setting, the load on the vehicle/engine, the throttle position, a set cruise control speed, data relating to the exhaust aftertreatment system 120, output power, engine speed, fluid consumption rate (e.g., fuel consumption rate, diesel exhaust fluid consumption rate, etc.), engine operating characteristics (e.g., whether all the cylinders are activated or which cylinders are deactivated, etc.), etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst).

The internal vehicle information may be stored by the controller 150 and selectively transmitted to one or more desired sources (e.g., another vehicle such as in a vehicle-to-vehicle communication session, a remote operator, etc.). In other embodiments, the controller 150 may provide the internal vehicle information 160 to the telematics unit 130 whereby the telematics unit transmits the internal vehicle information 160 to one or more desired sources (e.g., a remote device, an operator of the telematics unit, etc.). All such variations are intended to fall within the spirit and scope of the present disclosure.

In this regard because the components of FIG. 1 are shown to be embodied in a vehicle 100, the controller 150 may be structured as an electronic control module (ECM). The ECM may include a transmission control unit and any other control unit included in a vehicle (e.g., exhaust aftertreatment control unit, engine control module, powertrain control module, etc.). The function and structure of the controller 150 are shown described in greater detail in FIG. 2.

Figure 2:
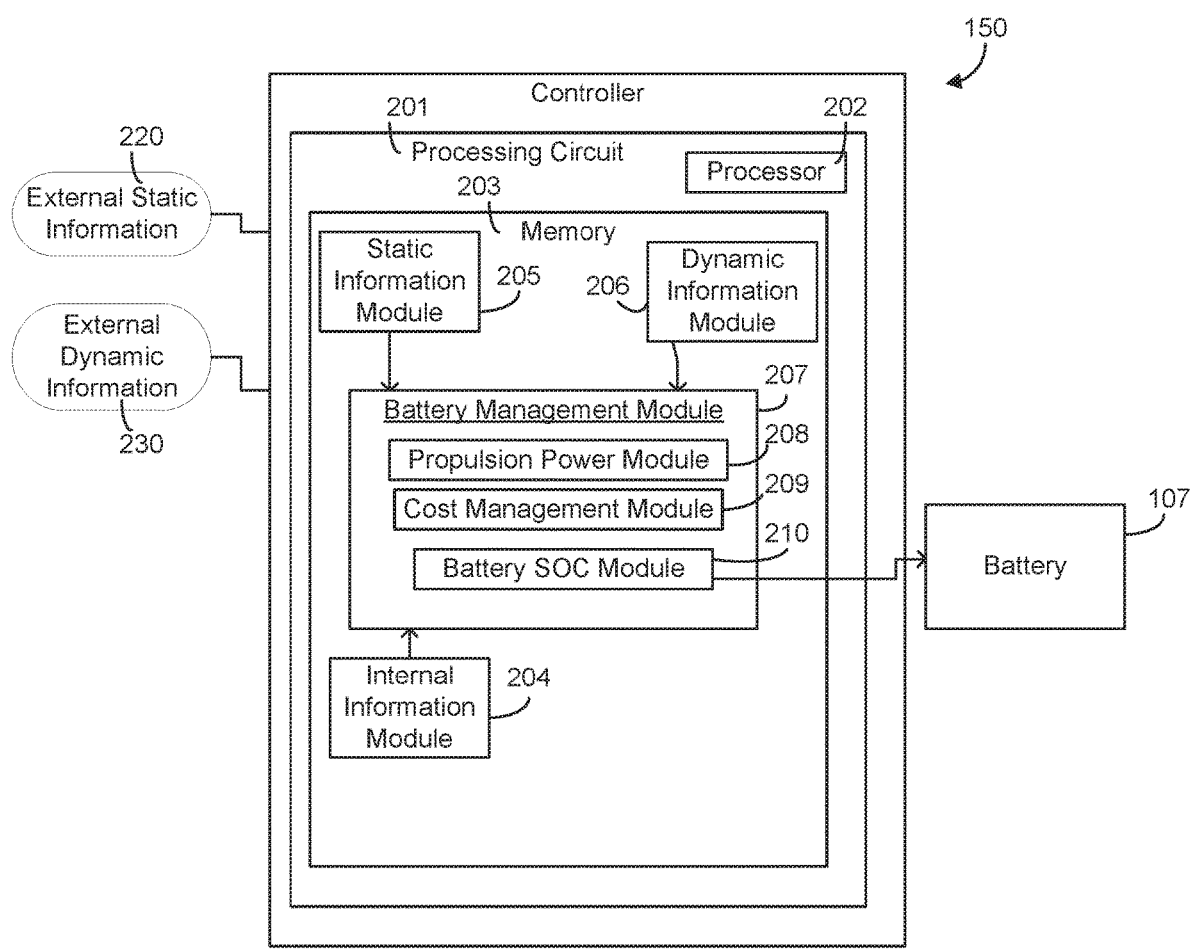
FIG. 2 is a schematic diagram of the controller used with the vehicle of FIG. 1, according to an example embodiment.

Accordingly, referring now to FIG. 2, the function and structure of the controller 150 are shown according to one example embodiment. The controller 150 is shown to include a processing circuit 201 including a processor 202 and a memory 203. The processor 202 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 203 (e.g., NVRAM, RAM, ROM, Flash Memory, hard disk storage, etc.) may store data and/or computer code for facilitating the various processes described herein. Thus, the one or more memory devices 203 may be communicably connected to the controller 150 and provide computer code or instructions to the controller 150 for executing the processes described in regard to the controller 150 herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 is shown to include various modules for completing the activities described herein. More particularly, the memory 203 includes an internal information module 204, a static information module 205, and a dynamic information module 206, all of which are communicably coupled to a battery management module 207, which is operationally and communicably coupled to the battery 107. The battery management module 207 is shown to include a propulsion power module 208, a cost management module 209, and a battery SOC module 210. Among other purposes, the modules of the memory 203 are adapted to manage a SOC of the battery 107 to meet or substantially meet a requested or predicted power and energy demand at a particular location at a particular time based on at least one piece of internal vehicle information, external static information, and external dynamic information and, in certain embodiments, based on one or more predefined desired operating parameters of the vehicle 100 (e.g., minimize fuel consumption, minimize emissions, etc.). While various modules with particular functionality are shown in FIG. 2, it should be understood that the controller 150 and memory 203 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The internal information module 204 is structured to receive, gather, and/or acquire internal vehicle information. In one embodiment, the internal information module 204 includes one or more data acquisition devices within the vehicle 100, such as the diagnostic and prognostic system 135, that facilitate acquisition of the internal vehicle information. In another embodiment, the internal information module 204 includes communication circuitry for facilitating reception of the internal information. In still another embodiment, the internal information module 204 includes machine-readable content for receiving and storing the internal vehicle information. In yet another embodiment, the internal information module 204 includes any combination of data acquisition devices, communication circuitry, and machine readable content. As mentioned above, the internal information may include any type of internal information regarding the vehicle 100 and from the vehicle 100 itself (e.g., a vehicle speed, a load on the vehicle, a torque output, a power consumption rate of one or more electrified accessories, data regarding one or more aerodynamic devices, an engine temperature, one or more fault codes or a history of fault codes, etc.). The internal information module 204 is structured to provide the acquired and/or gathered internal information to the battery management module 207.

The static information module 205 is structured to receive, gather, and/or acquire external static information 220 from one or more external static information sources (e.g., the map database 172) and provide or transmit the external static information to the battery management module 207. The static information module 205 may also store the received external static information, where the storage configuration may be variable from application-to-application (e.g., store external static information for the past thirty days, etc.). In this regard, the static information module 205 may correlate various pieces of static information with frequently traveled routes for the vehicle 100 in order to facilitate fast retrieval and use. For example, if an operator frequently travels (e.g., once a month) from Wisconsin to Florida, the static information may include toll locations, intersections, speed limits, road grade, etc., for various parts along the route. Advantageously, this information may be recalled by the static information module 205 to provide to the battery management module 207 on-demand. As mentioned above, the static information may include any piece of information or data that is static in nature (e.g., unchanging with respect to location, such as the road grade or curvature at a various location). Accordingly, the static information module 205 may include communication circuitry or other communication devices that facilitate the acquisition and reception of the external static information 220. In another embodiment, the static information module 205 may include machine readable content for facilitating the acquisition and reception of the external static information 220. In yet another embodiment, the static information module 205 may include any combination of hardware (e.g., communication components) and machine-readable content.

The dynamic information module 206 is structured to receive, acquire, and/or gather external dynamic information 230 from one or more external dynamic information sources (e.g., a remote device, another vehicle, an infrastructure component, etc.). As mentioned above, the external dynamic information 230 may include any information or data that may change with respect to time and distance (e.g., the weather conditions such as wind speed, etc.). In response, the dynamic information module 206 is structured to transmit or provide the received external dynamic information 240 to the battery management module 207. Similar to the static information module 205, the dynamic information module 206 may include one or more configurability options that dictate how long various pieces of dynamic information are stored and the rate of acquisition thereof. For example, the wind speed may be measured at a certain rate at a certain time and location, which is stored by the dynamic information module 206. The dynamic information module 206 may update the stored wind speed upon a manual update from the operator (e.g., a refresh input received via the I/O device 140) and/or upon a configuration that dictates or defines how often the dynamic data is provided to the controller 150. This may change as the vehicle is operated. In regard to the above example, the wind speed may be different at different times at the same location along the route from Wisconsin to Florida. Accordingly, the dynamic information module 206 is structured to update or trigger an update by sending an alert to the dynamic external information source in advance of the vehicle travelling to a certain location. Like the static information module 205, the dynamic information module 206 may include communication circuitry (e.g., relays, wiring, etc.) or other communication devices that facilitate the acquisition and reception of the external dynamic information 230. In another embodiment, the dynamic information module 206 may include machine readable content for facilitating the acquisition and reception of the external static information 230. In yet another embodiment, the dynamic information module 206 may include any combination of hardware (e.g., communication components) and machine-readable content.

In regard to either the external dynamic information or the external static information, both pieces may be received by each respective module 205 and 206 in advance of the vehicle 100 traveling a route or reaching a location. For example, if an operator designates a route for the vehicle 100, then the modules 205 and 206 may provide requests to the external static and dynamic information sources to receive the data at various points along the route. The external dynamic information may be periodically updated to account for changing conditions. If the operator does not designate a route, the modules 205 and 206, based on the current location and direction of travel of the vehicle 100, may utilize a relatively smaller window to request static and dynamic external information for locations/spots/positions that the vehicle 100 is likely to encounter. For example, if the operator is on a road with no turn-offs for two miles, the modules 205 and 206 can request dynamic and static external information for those two miles because the controller 150 may determine that the vehicle 100 must continue on this path. If the vehicle is in a busy area in a metropolitan area where one of several different routes may be traversed at any moment, the modules 205 and 206 may employ a region or zone of interest for acquiring external static and dynamic information (e.g., a two square mile radius or any predefined radius about the vehicle). The received data may then be correlated or associated with wherever the operator chooses to direct the vehicle 100 within that two square mile zone of interest. This zone of interest may then move with the vehicle 100. Of course, it should be understood that the present disclosure contemplates other techniques, methods, and strategies that may be used to control the frequency of external dynamic and static data providing based on location, such that all possible strategies are intended to fall within the spirit and scope of the present disclosure.

The battery management module 207 is structured to receive the external static information, external dynamic information, and internal information to manage the battery 207. As shown, the battery management module 207 includes a propulsion power module 208, a cost management module 209, and a battery SOC module 210.

Before turning to the specifics of the propulsion power module 208, cost management module 208 and generally speaking, based on the determinations of the propulsion power module 208 and the cost management module 209, the battery SOC module 210 is structured to selectively control and manage a SOC of the battery 107. Accordingly, in one embodiment, the battery SOC module 210 includes the battery 107 and any other hardware components associated with the electrified powertrain (e.g., sensors, etc.). As such, in some embodiments, the battery SOC module 210 may include a battery monitoring system. In another embodiment, the battery SOC module 210 includes communication circuitry to provide one or more commands to the battery 107 or charging/discharging controller operatively attached thereto. In yet another embodiment, the battery SOC module 210 includes machine-readable content for facilitating the reception and provision of various commands to control the battery 107 SOC.

To determine the battery SOC, the battery SOC module 210 may use any conventional technique (e.g., coulomb counting, etc.). Further, the battery SOC module 210 may manage the SOC of the battery 107 via any technique, such as controlling the charging current and voltage provided to the battery 107 (e.g., from regenerative braking, an alternator, another energy capture device or electrical energy providing device, etc.). Moreover, the battery SOC module 210 may also control other electrified accessories in the vehicle 100 in order to manage the SOC of the battery 107 (e.g., reduce electrical energy consumption from pre-designated non-critical components in order to conserve energy for an upcoming maneuver, etc.). In practice, the battery SOC module 210 may manage the battery SOC in accord with one or more predefined desired operating characteristics (e.g., fuel economy) based on at least one of the internal vehicle information, external static information, and external dynamic information.

The propulsion power module 208 is structured to determine, estimate, calculate, and/or predict a propulsion power for the vehicle 100 at a particular location at a particular time based on at least one of the internal information, external static information, and external dynamic information. Accordingly, the propulsion power module 208 may include one or more hardware components for facilitating determination of the propulsion power (e.g., load sensors, torque sensors, speed sensors, vehicle mass sensors, communication circuitry for relaying acquired data to/from the module 208, etc.), machine-readable content structured to calculate and/or determine the propulsion power, and/or some combination therewith.

In operation, based on the external static information, external dynamic information, and internal information, the propulsion power module 208 is structured to determine a load on the vehicle (or, analogously, a propulsion power to propel the vehicle) at, at least one of a current location and a potential future location for the vehicle and at a particular time. To determine or calculate the propulsion power, or an estimated or predicted load on the vehicle, the propulsion power module 208 may utilize one or more formulas, algorithms, processes, and the like for determining load. One such example set of formulas are shown below:

$$P_{propulsion}=P_{eng-out}=P_{aero}+P_{drag}+P_{gravity}+P_{accl}+P_{loss}+P_{acc} \quad \text{Equation (1)}$$

In Equation (1), the power consumed for propelling a vehicle $P_{propulsion}$, is equivalent to the power from the engine 101, $P_{eng-out}$. $P_{aero}$ refers to the aerodynamic power; $P_{drag}$ refers to the power needed or substantially needed to overcome wheel drag (e.g., from the road and tire interactions); $P_{accl}$ refers to the power to support acceleration of the vehicle; $P_{loss}$ refers to the losses that may occur and that may need to be accounted for when determining the power to propel the vehicle at various locations; and, $P_{acc}$ refers to the accessory power, where the accessory power includes electrical and mechanical accessory power.

$$P_{aero} = \left(\frac{A \cdot C_D \cdot \rho \cdot u^2}{2}\right) \cdot u \quad \text{Equation (2)}$$

In Equation (2), $A \cdot C_D$ is the vehicle aerodynamic drag area (A) times the aerodynamic drag coefficient ($C_D$), which is a measure of aerodynamic resistance of a cross-sectional area. The term $\rho$ is the air density, and the term u is the velocity or speed of the vehicle 100. The power to overcome wheel drag (P drag)$_{drag}$ may be calculated using Equation (3).

$$P_{drag}=[(C_{rr-dyn})(m \cdot g \cdot \cos \theta)(u)+(C_{rr-static})(m \cdot g \cdot \cos \theta)](u) \quad \text{Equation (3)}$$

The term $C_{rr-dyn}$ is the wheel dynamic rolling resistance and the term $C_{rr-static}$ is the wheel static rolling resistance. The term m is the mass of the vehicle 100, the term g is the acceleration due to gravity, and the term θ is a road slope. Equation (3) may be simplified to the form of Equation (4). The power required to overcome the force due to gravity ($P_{gravity}$) may be found from Equation (4), which uses previously defined terms.

$$P_{gravity}=(m \cdot g \cdot \sin \theta)(u) \quad \text{Equation (4)}$$

The power required to accelerate the vehicle 100 includes multiple components, including the power required to accelerate the vehicle alone ($P_{veh-accl}$), the power to accelerate the wheels 402 ($P_{whl-accl}$), the power required to accelerate the final drive 105 ($P_{FD-accl}$), the power required to accelerate the transmission 102 ($P_{TX-accl}$), and the power to accelerate the engine 101 ($P_{eng-accl}$). The calculation is shown in Equation (5).

$$P_{accl}=P_{veh-accl}+P_{whl-accl}+P_{FD-accl}+P_{TX-accl}+P_{eng-accl} \quad \text{Equation (5)}$$

Each of these terms may be individually calculated. The power required to accelerate the vehicle ($P_{veh-accl}$) may be found from the vehicle mass m, the vehicle acceleration a, and the vehicle velocity u, as shown in Equation (6).

$$P_{veh-accl}=m \cdot a \cdot u \quad \text{Equation (6)}$$

The power required to accelerate the wheels P ($P_{whl-accl}$) may be found from $I_{whl}$, which is the inertia of wheels, $\omega_{whl}$, which is the angular acceleration of the wheels, and $\omega_{whl}$, which is the angular velocity of the wheels, as shown in Equation (7).

$$P_{whl-accl}=I_{whl} \cdot \dot{\omega}_{whl} \cdot \omega_{whl} \quad \text{Equation (7)}$$

The power required to accelerate the final drive 105 ($P_{FD-accl}$) may be found from $I_{FD}$, which is the inertia of the final drive 105, $\dot{\omega}_{FD}$, which is the final drive angular acceleration, and $\omega_{FD}$, which is the final drive angular velocity, as shown in Equation (8).

$$P_{FD-accl}=I_{FD} \cdot \dot{\omega}_{FD} \cdot \omega_{FD} \quad \text{Equation (8)}$$

The power required to accelerate the transmission 102 ($P_{TX-accl}$) may be found from $I_{TX}$, which is the inertia of the transmission 102, $\dot{\omega}_{TX}$, which is the transmission angular acceleration, and $\omega_{TX}$, which is the transmission angular velocity, as shown in Equation (9).

$$P_{TX-accl}=I_{FD} \cdot \dot{\omega}_{TX} \cdot \omega_{TX} \quad \text{Equation (9)}$$

The power required to accelerate the engine 101 ($P_{eng-accl}$) may be found from $I_{Eng}$, which is the inertia of engine, $\dot{\omega}_{eng-out}$, which is the engine angular acceleration, and $\omega_{eng-out}$, which as mentioned above is the engine angular velocity, as shown in Equation (10).

$$P_{eng-accl}=I_{TX} \cdot \dot{\omega}_{eng-out} \cdot \omega_{eng-out} \quad \text{Equation (10)}$$

Each of the angular velocities and angular accelerations may be derived from data provided in the vehicle parameters in conjunction with the vehicle acceleration and velocity. The final term of Equation (1), $P_{loss}$, is a summary of the losses that need to be overcome in the vehicle 100. These losses may be summarized as in Equation (11).

$$P_{loss}=P_{FD-loss}+P_{TX-loss}+P_{eng-loss} \quad \text{Equation (11)}$$

The loss from the final drive 105 ($P_{FD-loss}$) may be calculated from $\Im(\omega_{FD-in} \cdot \tau_{FD-in})$, which may be found in a lookup table of the final drive torque loss, and $\omega_{FD-in}$, which is the angular velocity of the final drive at the input, as shown in Equation (12).

$$P_{FD-loss}=\Im(\omega_{FD-in} \cdot \tau_{FD-in}) \cdot \omega_{FD-in} \quad \text{Equation (12)}$$

The loss from the transmission 102 ($P_{TX-loss}$) may be calculated from $\Im(\omega_{TX-in} \cdot \tau_{TX-in})$, which may be found in a lookup table of the transmission torque loss, and $\omega_{TX\text{-}in}$, which is the angular velocity of the transmission at the input, as shown in Equation (13).

$$P_{TX\text{-}loss}=\Im(\omega_{TX\text{-}in},\tau_{TX\text{-}in})\cdot\omega_{TX\text{-}in} \quad \text{Equation (13)}$$

The loss from the engine 101 may be calculated from $\Im(\omega_{eng\text{-}out})$, which is found in a lookup table of the engine torque loss, as shown in Equation (14).

$$P_{eng\text{-}Loss}=\Im(\omega_{eng\text{-}out})\cdot\omega_{eng\text{-}out} \quad \text{Equation (14)}$$

The accessory power, $P_{acc}$, may be determined in any suitable manner and generally refers to the power needed or substantially needed to power mechanical and electrical accessories in the vehicle. It should be understood that the accessory power can also include hydraulic and pneumatic accessory power as well. As mentioned above, the determination of accessory power can be done in a variety of ways, such as watt meter or sensor for electrical accessories, a torque and speed sensor for mechanical accessories, and so on. Therefore, the power consumed in propelling the vehicle 100 may now be shown in terms of all the powers required, as shown in Equation (15).

$$P_{eng\text{-}out}=P_{aero}+P_{drag}+P_{gravity}+(P_{veh}\!\cdot\!accl+P_{whl}\!\cdot\!accl+P_{FD\text{-}accl}+P_{TX\text{-}accl}+P_{eng\text{-}accl})+(P_{FD\text{-}loss}+P_{TX\text{-}loss}+P_{eng\text{-}loss})+P_{acc} \quad \text{Equation (15)}$$

Even though $P_{eng\text{-}loss}$ is shown in Equation (15), it may be accounted for elsewhere. For example it may be integral to P eng-out and may not need to be explicitly included in Equation (15).

In regard to determining an estimated or predicted propulsion power at a future location and time, the propulsion power module 208 may utilize a vehicle speed target (u) to implement in, e.g., the aforementioned equations. The vehicle speed target may represent/coincide with the posted speed limit at that location, a speed relative to the posted speed limit (e.g., +/−5 miles-per-hour), and/or a user-defined speed. Based on the external dynamic information, the vehicle speed target may further represent/coincide with various operating conditions at the particular location at the particular time. For example, while the posted traffic speed limit may be 65 miles-per-hour, due to a traffic jam, the average speed of the vehicles in that location is 20 miles-per-hour. Accordingly, the vehicle speed target may be 20 miles-per-hour or some range or tolerance associated therewith. As such, the propulsion power module 208 may dynamically adjust the propulsion power calculation in response to static and dynamic conditions likely to be experienced by the vehicle 100. For example, the static information may indicate that in 0.5 miles, the road transitions from a relatively flat grade to a 3 percent grade. The propulsion power module 208 may then determine the likely load on the vehicle 100 in 0.5 miles based on this information. In another example, the static information 220 may indicate that the speed limit is about to in 0.5 miles decrease by 30 miles-per-hour while the grade stays constant. As such, the propulsion power module 208 may determine the likely new load or required power to propel the vehicle at the new speed limit (or some predefined acceptable variance relative to a posted speed limit) in this new location. While this external static information 220 may provide an indication of static conditions ahead of the vehicle 100, the external dynamic information 230 provides an indication of conditions that may affect the load or power determination. For example, if the posted speed limit is 65 miles-per-hour, without the dynamic information, the propulsion power module 208 may determine the expected, predicted, or likely load at this speed limit. However, the dynamic information 230 may indicate an upcoming traffic jam such that the average speed of the vehicles is 15 miles-per-hour. Advantageously, the propulsion power module 208 may then determine the load or expected load based on this dynamic information. As a result of the internal, external static, and external dynamic, the propulsion power module 208 is able to relatively accurately determine the power to propel the vehicle 100 at various locations and at various times of travel.

It should be understood that the above formulas represent only one example methodology for determining the power to propel the vehicle 100. Further, these formulas may be represented in one or more look-up tables stored by the propulsion power module 208 to facilitate relatively fast determinations. In other embodiments, additional and/or different power determination methodologies may be employed with all such variations intended to fall within the scope of the present disclosure.

Based on the determined propulsion power at a likely future location at a particular time for the vehicle 100, the battery SOC module 210 is structured to manage the SOC of the battery 107 according to an optimal manner, where the optimal manner is based on at least one of one or more predefined desired operating parameters. As such, management of the battery SOC may be based on at least one of the internal vehicle information, external static information, and external dynamic information.

As an example, the internal vehicle information may indicate a usage pattern of one or more electrified accessories 190 (e.g., an aerodynamic device 192). For example, during this stretch of road, the operator routinely or typically positions the trailer fairings in this particular position. In another example, because the outside temperature is above X, the operator tends to activate the A/C system. Accordingly and in regard to the active aerodynamic devices 192 example, active aerodynamic devices use energy for actuation and save energy by modifying vehicle aerodynamics. The battery SOC module 210 may predict, estimate, and/or determine a need for and level of usage of these devices based on look ahead information (e.g., external static and or dynamic information) to manage battery SOC levels to meet the demand. That is to say, the battery SOC module 210 may manage the battery SOC levels to meet the demand in an efficient manner such that there may not be a large energy consumption spike or other maneuver that may adversely affect efficient operation of the vehicle 100 at that location and time.

The need for and level of usage of these active aerodynamic devices may be determined in a variety of manners. In one instance, if the vehicle has already traversed a particular area, the controller 150 may recall the energy consumption information regarding one or more of the active aerodynamic devices during that portion and estimate that the energy consumption is approximately equal to that recalled level. Further, the controller 150 may look at the recalled date to observe which devices were active and not active. In another instance, the controller 150 may cross-reference the determined upcoming terrain or operating conditions (e.g., based on the external static and dynamic information) with operating conditions that are substantially similar to those upcoming. The controller 150 may then examine the active aerodynamic usage (and which active devices were active—to determine a whether they will likely be used) during those conditions and approximate, estimate, or determine that a similar usage amount is likely. In still another instance, the controller 150 may be predefined with energy usage level and operating conditions where each device is likely to be active. Those of ordinary skill in the art will appreciate that many other types of determination procedures are possible with all such intended to fall within the spirit and scope of the present disclosure.

As another example, the external static information 220 may indicate an uphill grade at the likely future location of the vehicle 100 (where, e.g., "uphill" may refer to a grade above a predefined threshold). Using the grade information of upcoming road segment, the propulsion power module 208 may determine, calculate, and/or compute an uphill power requirement or likely requirement of the vehicle. In response, the battery SOC module 210 may control the battery SOC by charging the battery 107 before arriving at the hill to meet the uphill demand (i.e., pre-uphill charging). This charging may be based on a predefined desired operating parameter, such as reducing fuel economy or emissions, such that additional power output from the engine 101 to traverse the uphill portion may be substantially alleviated. In turn, the current or substantially current power output from the engine 101 and powertrain system 110 generally (with the additional power output from the motor generator 106) may remain substantially constant. According to one embodiment, the battery 107 may be charged to meet the determined potential propulsion power on the uphill grade without increasing an engine output power amount (or, alternatively, changing another current powertrain operating characteristic). In this regard, the battery SOC module 210 may compare the current battery SOC to a determined SOC required or may be required to provide the additional power out in order for the engine 101 power output to remain substantially unchanged. Beneficially, this control process may reduce fuel consumption and emissions from the engine 101. In another embodiment, the battery SOC module 210 charges or facilitates charging of the battery 107 to meet or substantially meet the determined propulsion power on the uphill grade with only an incremental increase in engine output power. The incremental increase may refer to maintaining the same or substantially the same operating point on one or more engine operating maps (e.g., torque versus speed). The incremental increase may refer to a nominal predefined value that is based on the pre-increase engine output power (e.g., +5%, etc.). In other embodiments, the incremental increase may refer to a relative increase in engine temperature, engine fueling, emissions, and so on. Of course, those of ordinary skill in the art will appreciate that the "incremental increase" is meant to be broadly interpreted.

As another example, the external static information 220 may indicate an increase in speed for the vehicle 100 at the likely future location of the vehicle 100. Based on external static information alone, the increase in speed change be based on a change in a posted speed limit or a grade condition. Using the speed limit information of upcoming road segment, the propulsion power module 208 may determine a power requirement of the vehicle to adjust the speed to the new increased speed. In response and in regard to a new speed being greater than a current speed, the battery SOC module 210 may control the battery 107 SOC by charging the battery 107 before arriving at the speed limit change to meet the acceleration demand (i.e., pre-upspeed charging). Again, this charging may be based on one or more desired operating parameters, such that the power split between the battery and the engine are adjusted (and the SOC managed) in accord with that desired operating parameter(s) (e.g., to conserve fuel for the engine 101 to implicate the pre-upspeed charging subsequent discharging during traversal of the up-speed portion). According to one embodiment, the battery 107 may be charged to meet the determined potential propulsion power for the upspeed region without increasing an engine output power amount (or, alternatively, changing another current powertrain operating characteristic). In this regard, the battery SOC module 210 may compare the current battery SOC to a determined SOC required or may be required to provide the additional power out in order for the engine 101 power output to remain substantially unchanged. Beneficially, this control process may reduce fuel consumption and emissions from the engine 101. In other embodiments, an incremental increase in engine output power may be permitted, where an incremental increase has the same or similar definitions as described above.

As still another example, the external static information 220 may indicate a downhill grade at the likely future location of the vehicle 100 (where, e.g., "downhill" may be defined based on one or more thresholds). Using the grade information regarding the upcoming road segment, the propulsion power module 208 may determine an available amount of vehicle potential energy and/or braking energy during the downhill section. For example, due to the downhill section, the propulsion power module 208 may determine that the brakes may be utilized for a duration of time corresponding with the speed of the vehicle in connection with the length of the downhill. As such, using one or more tables, formulas, correlations, etc., the propulsion power module 208 may determine an expected potential amount of energy that may be captured from the braking (e.g., via a regenerative braking device). In response, the battery SOC module 210 may control the battery SOC by discharging the battery 107 before arriving at the downhill section of the road to capture the maximum amount of that regenerated energy (i.e., pre-downhill discharging of the battery 107). Advantageously, the pre-downhill discharging may correspond with a route segment or location that would otherwise (i.e., during conventional operation) have been powered by only the engine 101. As such, this power boost may reduce fuel consumption, emissions, and wear/tear on the engine 101.

As yet another example, the external static information 220 may indicate a decrease in vehicle speed condition existing at the likely future location of the vehicle 100. Using the speed limit information of upcoming road segment, the propulsion power module 208 may compute an available amount of vehicle kinetic energy and/or braking energy available during the deceleration section (e.g., using the same or similar principles as described above with respect to the regenerative braking device). In response, the battery SOC module 210 may control the battery SOC by discharging the battery before arriving at the deceleration (i.e., down speed) section of the route to capture a maximum or nearly maximum amount of that regenerated energy (i.e., pre-down speed discharging). Advantageously, as in the above example, the battery SOC module 210 may direct and facilitate discharging of the battery 107 to, e.g., power the motor generator 106 at a route location that would typically or otherwise not receive this additional power boost. As such, a reduction in fuel consumption and emissions may be realized.

As still a further example, at least one of the external static and dynamic information 220, 230 may indicate a regulated upcoming zone or region for the vehicle 100. Knowledge of the path of the vehicle 100 and surrounding/accompanying regulations may provide an indication of at least one of a noise threshold, a low/zero emissions regions, an engine braking circumstance (e.g., no engine braking for this stretch of land), and the like. In response, the propulsion power module 208 may predict, estimate, and/or determine an energy requirement of the vehicle while in that zone (e.g., the power required or substantially required to traverse that region at the target vehicle speed). The battery SOC module 210 may predict, determine, and/or calculate an electrical energy requirement to meet the zone regulations and the vehicle demand. For example, due to a low noise requirement, the battery SOC module 210 may determine that the motor generator 106 should provide additional power through this region to reduce power and potential noise excursions from the engine 101. In another example, in a no engine braking region, the battery SOC module 210 may determine that that a relatively lesser amount of energy capture opportunities (e.g., via regenerative braking) may be provided such that the energy from the battery 107 should be conserved for potentially critical maneuvers. As such, the power split may favor the engine 101 in this case. Accordingly, the battery SOC module 210 may control and/or manage the battery 107 SOC by selectively charging/discharging the battery and managing power generation and consumption of the battery during the trip segment before entering the regulated zone.

As another example and in regard to primarily external dynamic information 230, the external dynamic information 230 may provide an indication of one or more traffic conditions at a likely future location of the vehicle 100. The dynamic information 230 may provide an indication of traffic conditions such as a traffic density, an average vehicle speeds, a congestion amount, information available through vehicle-to-vehicle or vehicle-to-X communication, etc. The propulsion power module 208 may use this information to predict driver behavior, a vehicle power requirement, a vehicle speed (e.g., a target vehicle speed for use in determining the power requirement), etc. With this determination/prediction, the battery SOC module 210 may prepare the vehicle battery 107 to meet the predicted demand by pre-traffic charging or discharging of the battery 107 to a calculated, determined, or estimated SOC level.

As yet a further example and still in regard to primarily external dynamic information, the external dynamic information 230 may indicate a weather condition that may affect operation of the vehicle. Determination of whether the weather condition (or other external dynamic information) will affect operation of the vehicle is a highly configurable parameter. For example, "affect operation" may mean that the vehicle speed will decrease by a predefined percentage of the current speed (e.g., by more than ten percent); "affect operation" may be based on a predefined threshold indicative of "affecting operation" conditions (e.g., wind speeds above X miles-per-hour); based on an explicit input from the operator; and so on. Thus, "affect operation" is meant to be highly configurable and may change from application-to-application. The indicated weather condition may include, but is not limited to, a presence of at least one of rain, ice, snow, etc. that may be used to determine induced road grades and speed limit zones. In response, the battery SOC module 210 may prepare the battery 107 by achieving a calculated SOC by selectively charging or discharging the battery 107 before such conditions occur. For example, in icy conditions, a turn may induce braking events which does not occur in normal conditions. In still another example, anticipation and cancellation of trailer sway using in wheel motors may be implemented.

As still another example, the battery SOC module 210 may manage the battery 107 SOC based on a determined or predicted amount of braking energy (i.e., to charge the battery 107) from one or more energy braking mechanisms based on at least of the internal vehicle information, external static information, and external dynamic information. In this regard, "braking energy" refers to energy generated, produced, or otherwise captured during a braking event that may be useable with the battery 107 to, e.g., charge the battery 107 and manage the SOC. The braking energy may be produced or captured from a variety of braking mechanisms included with the vehicle. A non-exhaustive list of braking mechanisms includes friction braking, engine braking, and regenerative braking. Friction braking refers to braking caused by, e.g., drum or disk brake application. Engine braking, also referred to as "jake braking," refers to the closed or mostly closed throttle position in petrol engines when the accelerator pedal is released and refers to the opening of an exhaust valve(s) to release compression gases in a diesel engine. Regenerative braking, as described herein above, refers to an energy recovery device (e.g., an electric motor, an electric motor/generator unit, etc.) that converts and stores energy or some energy during braking rather than that energy being dissipated as, e.g., heat. It should be understood that the aforementioned list of braking devices/mechanisms is not meant to be exhaustive as the present disclosure contemplates other and additional types of braking mechanisms that are intended to fall within the scope of the present disclosure. In operation, the battery SOC module 210 may modulate or control activation of these braking mechanisms to manage the SOC of the battery 107.

As an example of this braking mechanism modulation to manage SOC of the battery 107, the battery SOC module 210 may compare the current battery SOC level to one or more threshold levels (e.g., a maximum SOC level, a minimum SOC level, a level for a predefined condition such as an uphill or downhill grade, etc.). Further, one or more algorithms, look-up tables, and the like may be included with the battery SOC module 210 that define, predict, or otherwise estimate an approximate "braking energy capture amount" for various particular operating conditions. For example, at 30 MPH and an uphill grade of 2%, the braking energy capture amount for regenerative braking is X kilowatt hours whereas the braking energy capture amount for another braking device may be X-50 kilowatt hours. In this regard, in one embodiment, knowledge of the capture amounts for various braking devices can be predefined in the battery SOC module 210. In other embodiment, the battery SOC module 210 may track energy capture amounts from each braking mechanism and create a table that includes an energy capture amount estimate for a braking mechanism (e.g., regenerative braking) at a particular operating condition. As a result, as the vehicle is operated, the table will become more full/populated to, beneficially, be tailored to the particular driving characteristics (e.g., hard-braking, hard turns, etc.) of the operator and specific to that vehicle. In another embodiment, a combination of predefined energy capture amounts for specific braking devices at particular conditions and the aforementioned data-collection technique may be used to populate a table for reference or use by the battery SOC module 210. As a result, the battery SOC module 210 may estimate, determine, predict, etc. an approximate energy capture amount from a particular braking mechanism based on one or more upcoming or current conditions along a route based on internal vehicle information, external static information, and/or external dynamic information.

As an example, external static information may indicate an upcoming downhill grade while internal vehicle information indicates that the battery SOC is below a predefined minimum SOC threshold. Because regenerative braking may have the highest yield of the braking devices (i.e., most energy capture ability) based on information contained within the battery SOC module 210 (e.g., one or more look-up tables or other information storage techniques that indicate a capture amount at or close to the upcoming downhill grade for a particular vehicle speed), the battery SOC module 210 may activate and prioritize the regenerative braking mechanism over other braking mechanisms in order to increase the SOC to at or above the predefined minimum threshold.

As another example, the external dynamic information may indicate upcoming headwinds that may require additional power to maintain a desired vehicle speed, which in this example is the posted speed limit in that region. However, the battery SOC is below a predefined threshold. As a result, the battery SOC module 210 may manage a braking mechanism(s) in advance of the headwind section to charge the battery above a desired SOC threshold, such that the battery may be discharged during that region to provide a "boost" of energy to maintain the desired vehicle speed against the headwind conditions.

Thus, the battery SOC module 210 may manage, modulate, and prioritize various braking mechanism to manage a SOC of the battery for system optimization (e.g., maintaining a desired vehicle speed, minimizing emissions, etc.).

It should be understood that the aforementioned examples are not meant to be limiting and only represent a few instances of how the battery management module 207 of the present disclosure may beneficially manage the SOC levels of the battery 107 to efficiently or optimally control the vehicle 100 based on one or more predefined desired operating parameters for the vehicle 100.

In this regard, the cost management module 209 may be structured to use at least one of the piece of external dynamic information 230 regarding at least one of a market characteristic and regulation to reduce and/or optimize a cost of operation of the vehicle 100. For example, the market characteristics and regulation may provide an indication of at least one of a regional electricity costs, a fuel costs, an emission regulation (e.g., CO2 regulations), and so on. Based on at least one of these market costs and regulations, the battery SOC module 210 may proactively manage the battery SOC levels to optimize/reduce the total cost of operation over a daily mission. In this regard, the battery SOC module 210 may decide and plan for vehicle charging locations and rates. The battery SOC module 210 may also utilize geographical and time based variation in electricity prices and fuel costs (e.g. a line haul truck travelling across states/regions). As an example, the external dynamic information 230 may indicate fuel costs for three locations over the next three miles of a route. The external dynamic information 230 may also indicate that one of the locations has an electricity charging location. Accordingly, the battery SOC module 210 may select that location as a potential "fill-up" location in order to improve efficiency by having the ability to obtain both fuel and electricity. This may be the case for each of the three locations having the same fuel cost or even if the chosen location has a higher fuel cost due to the convenience of obtaining both during one stop. Similarly, based on the ability to charge at that location, the battery SOC module 210 may selectively command discharging of the battery 107 to take advantage of the relatively close fill-up location. Beneficially, these discharges may offset power requirements from the engine 101 to reduce emissions and/or fuel consumption.

While the battery management module 207 is described above in regard to the propulsion power module 208 and cost management module 209, due to the connectivity of the vehicle 100, in some embodiments, the battery management module 207 may receive remote instructions. The remote instructions may be provided by an external information providing source, such as a telematics provider. The remote instructions may prescribe and control reference set points for the battery 107 (e.g., a nominal SOC, a minimum SOC, a maximum SOC, etc.) based on, e.g., weather, for route planning, a vehicle history, a prognosis, a time of day, a day of year, a local event, a power grid status and pricing (e.g., a location of charging nodes on the power grid, a price of electrical energy at each node or a subset of nodes because pricing may differ from node-to-node), etc. Advantageously, this capability may be utilized to improve fleet management.

Figure 3:
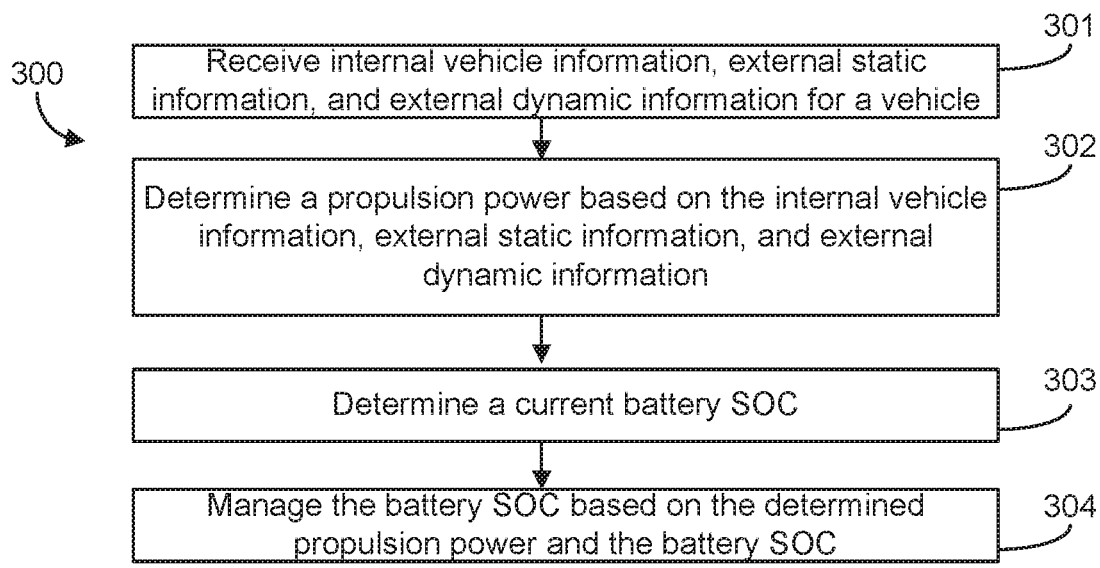
FIG. 3 is a flow diagram of a method of optimally controlling the power split between an internal combustion engine and an electric motor via management of a battery state of charge in a vehicle, according to an example embodiment.

Referring now to FIG. 3, a method of controlling the power split between an internal combustion engine and an electric motor via management of a battery state of charge in a vehicle is shown according to an example embodiment. Because method 300 may be implemented with the controller 150 and in the system 50, reference may be made to one or more features of the controller 150 and the system 50 to explain method 300.

At process 301, internal vehicle information, external static information, and external dynamic information for a vehicle is received. The interval vehicle information, external static information, and external dynamic information may have the same definition as described herein above.

At process 302, a propulsion power for the vehicle is predicted, determined, and/or estimated based on the internal vehicle information, external static information, and external dynamic information. This process may be implemented at one or more locations and at one or more times of travel for the vehicle 100.

At process 303, a battery SOC is determined for vehicle. In this regard, the SOC may be determined using any piece of battery data and via any process, as described above in regard to the battery SOC module 210 (e.g., coulomb counting).

At process 304, the battery SOC is managed (e.g., via the battery SOC module 210) based on the determined propulsion power and the battery SOC. The battery SOC may be managed in accord with one or more predefined desired operating parameters of the vehicle. In this regard, an optimal split of power output from the battery and engine may be implemented. For example, the battery SOC may be managed in response to an upcoming uphill grade or increased speed region to ensure that the battery may be discharged during the uphill grade or increased speed region to provide additional power output to the vehicle 100 and reduce reliance on the engine to, in turn, reduce fuel consumption and emissions.

Figure 4:
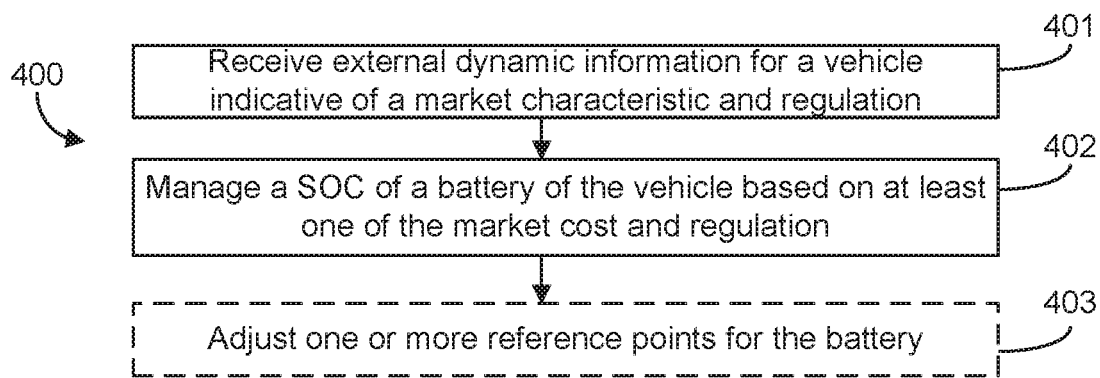
FIG. 4 is a flow diagram of a method of managing a battery state of charge in a vehicle in response to various pieces of external dynamic information, according to an example embodiment.

While process 300 facilitates using the battery SOC to adjust to changing acceleration demands in advanced of traveling a particular route, the battery SOC may also be managed in accord with one or more market characteristics and/or market regulations. Referring now to FIG. 4, a flow diagram of a method of managing a battery SOC in response to one or more pieces of external dynamic information is shown, according to one embodiment.

At process 401, external dynamic information for a vehicle indicative of at least one of a market characteristic and a regulation is received. In response, at process 402, the SOC of a battery of the vehicle is managed. The SOC may be managed based on market characteristics, such as fuel costs, and market regulations, such as emission requirements. For example, for a route of the vehicle, the next fifty miles corresponds with a relatively higher fuel cost than for ten miles following that stretch. Accordingly, the battery SOC may be managed to facilitate relatively more discharging during this stretch to provide an enhanced power output to reduce reliance on the engine and the need or potential need to fill up with the relatively more expensive fuel. As another example, electricity costs that may be used to charge the battery may differ along a route: $X for the first fifty miles and $X+10 for the next 100 hundred miles. Accordingly, the battery SOC module may manage the SOC of the battery to take advantage of the relatively lower cost for electricity during the first fifty miles to reduce the need for charging during the next 100 miles (e.g., in a hybrid vehicle, the battery SOC module may reduce the need to charge the vehicle from one or more external grid charging nodes). In still another example, if the market regulation is a relatively stringent emissions requirement, the battery SOC module may facilitate charging before that region in order to facilitate discharging during that region to reduce at least some of the reliance on the engine in order to reduce emissions. In yet another example, the market regulation may be a permissible noise level (e.g., an indication that no engine braking is permitted, an actual allowable decibel amount, etc.). In response, the battery SOC module may facilitate relatively more battery discharging during this zone to reduce reliance on the engine in order to meet or substantially meet the permissible vehicle noise level. Thus, process 400 may reduce the operational cost of the vehicle.

In some embodiments, process 400 may include process 403, where one or more reference points for the battery are adjusted/managed in response to at least one of the internal and external static and dynamic pieces of information. By adjusting the reference points (e.g., nominal SOC, maximum SOC, minimum SOC, etc.), process 403 may effectively control the energy discharge and charge ability of the battery responsive to static and dynamic operating conditions for the vehicle.

Due to the connectivity with a remote source (e.g., the external dynamic source or static source from FIG. 1), in one embodiment, wherein the calibration set point is determined by a remote cloud based controller (i.e., a controller for at least one of the external dynamic source and static information source) using the external dynamic information, external static information, and internal information. The remote cloud based controller may then transmit the determined calibration set point to the vehicle of interest to selectively adjust set points in each vehicle that is a part of the environment. Beneficially, custom control is provided for each vehicle in the environment to improve performance of each vehicle and, if a fleet embodiment, for the fleet in general.

It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIG. 1) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed:

1. An apparatus, comprising:
a battery management module for a hybrid vehicle, the battery management module including:
a propulsion power module structured to determine a potential propulsion power for the hybrid vehicle at a particular location of a route of the hybrid vehicle at a particular time based on at least one of internal information regarding the hybrid vehicle, external static information regarding the route of the hybrid vehicle, and external dynamic information regarding one or more upcoming potential conditions along the route of the hybrid vehicle; and
a battery state of charge module structured to manage a state of charge of a battery of the hybrid vehicle at the particular location at the particular time based on the determined potential propulsion power;
wherein responsive to determining a downhill grade at the particular location, the battery state of charge module is structured to determine an amount of braking energy available during traversal of the downhill grade and discharge the battery to direct energy to at least one of a generator or an electrified accessory of the hybrid vehicle before the downhill grade to enable reception of at least a portion of the determined amount of braking energy available.

2. The apparatus of claim 1, wherein responsive to the external static information indicating an uphill grade at the particular location and the determined potential propulsion power on the uphill grade for a target hybrid vehicle speed, the battery state of charge module is structured to facilitate a charging of the battery in advance of the uphill grade.

3. The apparatus of claim 2, wherein the battery is charged to meet the determined potential propulsion power on the uphill grade without increasing an engine output power amount.

4. The apparatus of claim 2, wherein the battery is charged to meet the determined potential propulsion power on the uphill grade with only an incremental engine output power amount.

5. The apparatus of claim 1, wherein responsive to at least one of the external static and external dynamic information indicating an increase in vehicle speed at the particular location and the determined potential propulsion power based on the increase in vehicle speed, the battery state of charge module is structured to facilitate a charging of the battery in advance of the particular location.

6. The apparatus of claim 4, wherein the battery is charged to meet the determined potential propulsion power at the particular location without increasing an engine output power amount.

7. The apparatus of claim 1, wherein responsive to at least one of the external static, external dynamic, and internal information indicating a decrease in vehicle speed at the particular location and the determined potential propulsion power at the particular location, the battery state of charge module is structured to facilitate a discharging of the battery before the particular location.

8. The apparatus of claim 1, wherein responsive to at least one of the external static and external dynamic information indicating that the particular location coincides with a regulated zone, the battery state of charge module is structured to manage the state of charge in accord with a zone regulation associated with the regulated zone and the determined potential propulsion power.

9. The apparatus of claim 8, wherein the zone regulation includes at least one of a permissible vehicle noise level, an engine braking regulation, and an emissions regulation.

10. The apparatus of claim 1, wherein responsive to at least one of the external dynamic information and external static information indicating at least one of a traffic condition and a weather condition that is determined to affect operation of the hybrid vehicle, the battery state of charge module is structured to facilitate selective charging and discharging the battery before reaching the traffic and weather conditions.

11. The apparatus of claim 1, wherein the battery management module further includes a cost management module, wherein the cost management module is structured to receive at least one of a market characteristic and a market regulation at the particular location at the particular time, and wherein the battery state of charge module is structured to manage the state of charge of the battery based on the at least one of the market characteristic and the market regulation to reduce a cost of operation of the hybrid vehicle.

12. The apparatus of claim 11, wherein the hybrid vehicle is a plug-in hybrid vehicle.

13. The apparatus of claim 12, wherein the battery management module manages battery charging from an external source based on at least one of the market regulation and market characteristic.

14. The apparatus of claim 11, wherein at least one of the market characteristic and market regulation includes an indication of at least one of a location of charging nodes for an electric power grid and a fuel price.

15. The apparatus of claim 1, wherein the battery management module is further structured to manage the state of charge of the battery based on a determined need for and usage level of one or more active aerodynamic devices at the particular location.

16. A method, comprising:
receiving, by a controller of a hybrid vehicle, at least one of internal hybrid vehicle information, external static information, and external dynamic information;
determining, by the controller of the hybrid vehicle, a propulsion power for the hybrid vehicle at a particular location at a particular time based on at least one of the internal hybrid vehicle information, the external static information, and the external dynamic information;
determining, by the controller, a current state of charge of a battery, wherein the battery is operatively coupled to an electric motor in the hybrid vehicle; and
managing, by the controller, a state of charge of the battery at the particular location at the particular time based on the current state of charge and the determined propulsion power;
wherein responsive to determining a downhill grade at the particular location, the managing includes:
determining, by the controller, an amount of braking energy available during traversal of the downhill grade, and
discharging the battery to direct energy to at least one of a generator or an electrified accessory of the hybrid vehicle before the downhill grade to enable reception of at least a portion of the determined amount of braking energy available.

17. The method of claim 16, wherein responsive to at least one of the external static and external dynamic information indicating that the particular location coincides with a regulated zone regarding at least one of a permissible vehicle noise level, an engine braking regulation, and an emissions regulation, managing, by the controller, the state of charge in accord with the at least one of the permissible vehicle noise level, the engine braking regulation, and the emissions regulation as well as the determined potential propulsion power.

18. A system, comprising:
a battery for use in a vehicle; and
a controller communicably and operatively coupled to the battery, the controller structured to:
receive at least one of internal vehicle information, external static information, and external dynamic information;
determine a propulsion power for the vehicle at a particular location at a particular time based on at least one of the internal vehicle information, the external static information, and the external dynamic information;
determine a current state of charge of a battery; and
manage a state of charge of the battery at the particular location at the particular time based on the current state of charge and the determined propulsion power
wherein in response to determining a downhill grade at the particular location:
determine an amount of braking energy available during traversal of the downhill grade, and
discharge the battery to direct energy to at least one of a generator or an electrified accessory of the vehicle before the downhill grade to enable reception of at least a portion of the determined amount of braking energy available.

19. The system of claim 18, wherein responsive to at least one of the external static and external dynamic information indicating that the particular location coincides with a regulated zone regarding at least one of a permissible vehicle noise level, an engine braking regulation, and an emissions regulation, the controller is structured to manage the state of charge of the battery in accord with the at least one of the permissible vehicle noise level, the engine braking regulation, and the emissions regulation as well as the determined potential propulsion power.

* * * * *